(12) United States Patent
D'Souza et al.

(10) Patent No.: US 6,551,366 B1
(45) Date of Patent: Apr. 22, 2003

(54) SPRAY DRYING METHODS OF MAKING AGGLOMERATE ABRASIVE GRAINS AND ABRASIVE ARTICLES

(75) Inventors: Andrew S. D'Souza, St. Paul, MN (US); Bradley D. Craig, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/710,371

(22) Filed: Nov. 10, 2000

(51) Int. Cl.[7] .............................. C09K 3/14; B24D 3/00; B24D 3/14; B24D 18/00
(52) U.S. Cl. ........................... 51/309; 51/307; 51/308; 51/295; 51/298
(58) Field of Search ..................... 51/307, 308, 309, 51/295, 298; 23/313 R (56) References Cited

U.S. PATENT DOCUMENTS

| | | |
|---|---|---|
| 2,958,593 A | 11/1960 | Hoover et al. |
| 3,916,584 A | 11/1975 | Howard et al. |
| 4,311,489 A | 1/1982 | Kressner |
| 4,364,746 A | 12/1982 | Bitzer et al. |
| 4,453,107 A | 6/1984 | Keenan |
| 4,541,842 A | 9/1985 | Rostoker |
| 4,543,107 A | 9/1985 | Rue |
| 4,588,419 A | 5/1986 | Caul et al. |
| 4,652,275 A | 3/1987 | Bloecher et al. |
| 4,734,104 A | 3/1988 | Broberg |
| 4,737,163 A | 4/1988 | Larkey |
| 4,741,743 A | 5/1988 | Narayanan et al. |
| 4,751,137 A | 6/1988 | Halg et al. |
| 4,799,939 A | 1/1989 | Bloecher et al. |
| 4,800,685 A | 1/1989 | Haynes, Jr. |
| 4,898,597 A | 2/1990 | Hay et al. |
| 4,918,874 A | 4/1990 | Tiefenbach, Jr. |
| 4,997,461 A | 3/1991 | Markhoff-Matheny et al. |
| 5,038,453 A | 8/1991 | Kurita et al. |
| 5,094,672 A | 3/1992 | Giles, Jr. et al. |
| 5,110,332 A | 5/1992 | Isaksson et al. |
| 5,118,326 A | 6/1992 | Lee et al. |
| 5,131,926 A | 7/1992 | Rostoker et al. |
| 5,152,917 A | 10/1992 | Pieper et al. |
| 5,203,884 A | 4/1993 | Buchanan et al. |
| 5,203,886 A | 4/1993 | Sheldon et al. |
| 5,282,875 A | 2/1994 | Wood et al. |
| 5,378,251 A | 1/1995 | Culler et al. |
| 5,417,726 A | 5/1995 | Stout et al. |
| 5,427,595 A | 6/1995 | Pihl et al. |
| 5,436,063 A | 7/1995 | Follett et al. |
| 5,443,906 A | 8/1995 | Pihl et al. |
| 5,496,386 A | 3/1996 | Broberg et al. |
| 5,500,273 A | 3/1996 | Holmes et al. |
| 5,520,711 A | 5/1996 | Helmin |
| 5,549,962 A | 8/1996 | Holmes et al. |
| 5,609,706 A | 3/1997 | Benedict et al. |
| 5,679,067 A | 10/1997 | Johnson et al. |
| 5,714,259 A | 2/1998 | Holmes et al. |
| 5,738,696 A | 4/1998 | Wu |
| 5,756,409 A | 5/1998 | van Dijen et al. |
| 5,863,308 A | 1/1999 | Qi et al. |
| 5,903,951 A | 5/1999 | Ionta et al. |
| 5,910,471 A | 6/1999 | Christianson et al. |
| 5,954,844 A | 9/1999 | Law et al. |
| 5,961,674 A | 10/1999 | Gagliardi et al. |
| 5,975,988 A | 11/1999 | Christianson |
| 6,155,910 A | * 12/2000 | Lamphere et al. ............ 451/41 |

FOREIGN PATENT DOCUMENTS

| | | | |
|---|---|---|---|
| DE | 2941298 | * | 4/1981 |
| EP | 0 444 824 A2 | | 9/1991 |
| EP | 0 530 983 A2 | | 3/1993 |
| JP | 62 079841 A | | 4/1987 |
| WO | WO 95/03370 | | 2/1995 |

OTHER PUBLICATIONS

Vol. 1 P.W. McMillan: Glass–Ceramics. 1964 (Second edition, 1979)(no month).

* cited by examiner

*Primary Examiner*—Michael Marcheschi (57) ABSTRACT

Spray drying methods for making agglomerate abrasive grains. The agglomerate abrasive grains are useful for making abrasive articles.

44 Claims, 1 Drawing Sheet

SPRAY DRYING METHODS OF MAKING AGGLOMERATE ABRASIVE GRAINS AND ABRASIVE ARTICLES

FIELD OF THE INVENTION

The present invention relates to methods of making a plurality of agglomerate abrasive grains and abrasive articles. More particularly, the present invention relates to spray-drying methods of making a plurality of agglomerate abrasive grains and abrasive articles.

BACKGROUND OF THE INVENTION

Various agglomerate abrasive grains are known in the art and have been used in a variety of abrasive articles such as coated abrasive articles (see, e.g., U.S. Pat. No. 3,916,584 (Howard, et al.); U.S. Pat. No. 5,714,259 (Holmes, et al.); U.S. Pat. No. 4,311,489 (Kressnar); U.S. Pat. No. 4,652,275 (Bloecher, et al.); U.S. Pat. No. 4,799,939 (Bloecher, et al.); U.S. Pat. No. 5,500,273 (Holmes, et al.); and U.S. Pat. No. 5,910,471 (Christianson, et al.)). Some of the known methods for making agglomerate abrasive grains can be disadvantageous because of their inability to provide a plurality of extremely small (e.g., diameters of 500 micrometers or less), spherical agglomerate abrasive grains.

A problem encountered with some known methods of making polymer (e.g., organic resin) bonded agglomerate abrasive grains is such agglomerate abrasive grains are not as strong as desired.

Yet, another problem is that some techniques for making of agglomerate abrasive grains require heating to temperatures on the order of 1200° C. to 1600° C. Certain agglomerate abrasive grains (e.g., diamond and cubic boron nitride abrasive grains) are not stable at such temperatures.

SUMMARY OF THE INVENTION

The present invention provides a spray drying method for making a plurality of agglomerate abrasive grains. The method comprises:

spray drying slurry to provide a plurality of precursor agglomerate abrasive grains, the slurry comprising:
  first mineral particles having a Moh's hardness of at least about 5;
  glass frit;
  solvent; and
  at least one of solvent-dispersible binder material or solvent-soluble binder material;

heating the plurality of precursor agglomerate abrasive grains to at least one temperature such that the glass frit at least partially fuses to provide a plurality of agglomerate abrasive grains each comprised of the first mineral particles bonded together via glass binder material.

In a preferred method according to the present invention, at least a portion (preferably, at least a majority by weight) of the first mineral particles having a Moh's hardness of at least about 5 are at least one of diamond abrasive grains or cubic boron nitride abrasive grains. This method can be used to make agglomerate abrasive grains comprised of at least one of diamond abrasive grains or cubic boron nitride abrasive grains at temperatures substantially below the temperatures at which diamond and/or cubic boron nitride is thermally unstable.

In another preferred method according to the present invention, the resulting agglomerate abrasive grains can be made having a fine grade (i.e., a small particle size). Typically the agglomerate abrasive grains made according to the method of present invention have an average particle size ranging from about 1 micrometer to about 500 micrometers, more typically about 1 to about 300 micrometers, even more typically about 1 to about 250 micrometers, and most typically about 1 micrometer to about 200 micrometers.

Agglomerate abrasive grains made according to the present invention may be incorporated into various abrasive articles such as coated abrasives, bonded abrasives (including vitrified and resinoid grinding wheels), nonwoven abrasives, and abrasive brushes. The abrasive articles typically comprise agglomerate abrasive grains made according to the present invention and abrasive article binder material. As one non-limiting example, at least a portion of the plurality of agglomerate abrasive grains can be combined with abrasive article binder material to provide an abrasive article. In one such embodiment, the method further comprises heat-treating the glass binder material to provide ceramic binder material bonding the first mineral particles together prior to combining at least a portion of the plurality of agglomerate abrasive grains with abrasive article binder material. As another non-limiting example, an abrasive layer comprising at least a portion of the plurality of agglomerate abrasive grains dispersed within abrasive article binder material is applied to a major surface of a backing to provide a coated abrasive article. In one such embodiment the method further comprises heat-treating the glass binder material to provide ceramic binder material bonding the first mineral particles together prior to applying the abrasive layer comprising at least a portion of the plurality of agglomerate abrasive grains dispersed within abrasive article binder material to the major surface of the backing to provide the coated abrasive article. It is also within the scope of the invention to heat-treat glass binder material to provide ceramic binder material after making an abrasive article (e.g., when the abrasive article binder material is a glass or crystalline ceramic).

Some preferred, agglomerate abrasive grains made according to the present invention are sufficiently porous to allow the abrasive article binder material to penetrate therein, which in some applications (including some coated and bonded abrasive articles) may be advantageous. In another aspect, embodiments of agglomerate abrasive grains made according to the present invention may be made having a desired level of porosity and/or bond strength between the mineral particles in order to provide preferential wearing of the agglomerate abrasive grains. Such preferential wearing of the agglomerate abrasive grains may be particularly desirable for bonded abrasive articles.

Alternatively, for example, the agglomerate abrasive grains made according to the present invention may be used as in loose form, including in abrasive slurries and as shot blast media.

As used herein, the terms "plurality of agglomerate abrasive grains" and "agglomerate abrasive grains" are considered to be synonymous.

DETAILED DESCRIPTION OF THE INVENTION

First Mineral Particles

The method of the present invention utilizes first mineral particles having a Moh's hardness of at least about 5. Typically, and depending, for example, on the particular abrading or polishing application, the Moh's hardness of the first mineral particles may be as high as at least 6, 7, 8, 9, or even 10. The first mineral particles primarily serve as the active grinding or polishing agent in an agglomerate abrasive grain. Examples of useful first mineral particles having a Moh's hardness of at least about 5 include, but are not limited to, those selected from the group consisting of diamond particles, silicon carbide particles, aluminum oxide particles, zirconium oxide particles, modified ceramic aluminum oxide particles, cubic boron nitride particles, titanium carbide particles, titanium nitride particles, cerium oxide particles, silicon dioxide particles, and combinations thereof. Preferably at least a portion, more preferably a majority by weight and most preferably all of the agglomerate abrasive grains are selected from the group consisting of diamond particles, silicon carbide particles, aluminum oxide particles, zirconium oxide particles, modified ceramic aluminum oxide particles, cubic boron nitride particles, titanium carbide particles, titanium nitride particles, cerium oxide particles, silicon dioxide particles, and combinations thereof.

The particle size of the first mineral particles can vary. Typically the average particle size (i.e., the largest dimension) of the first mineral particles is in the range from about 0.01 micrometer to about 100 micrometers, preferably from about 0.05 micrometer to about 50 micrometers, and most preferably about 0.1 micrometer to about 25 micrometers. The average particle size of the first mineral particles can vary with respect to the average particle size of the plurality of agglomerate abrasive grains in which they are contained. Typically, the average particle size of the first mineral particles is about 0.5 to about 50 percent of the average particle size of the agglomerate abrasive grains, preferably about 1 to about 40 percent, and most preferably about 2 to about 20 percent.

Typically, agglomerate abrasive grains prepared according to the method of the present invention each comprise about 1 to about 90 percent by weight of first mineral particles having a Moh's hardness of at least about 5, based upon the total weight of the respective agglomerate abrasive grain, preferably about 10 percent to about 80 weight percent, and most preferably about 40 to about 60 weight percent.

The slurry used to make the agglomerate abrasive grains typically comprises about 5 to about 75 percent by weight of first mineral particles having a Moh's hardness greater than about 5, based upon the total weight of the slurry, preferably about 10 to about 50 weight percent, and most preferably about 20 to about 30 weight percent.

Preferably the first mineral particles have at least one of a softening point, melting point, or decomposition temperature and the lower of the at least one of a softening point, melting point, or decomposition temperature of the first mineral particles is greater than the softening point of the glass frit.

Glass Frit

Glass frit is at least partially fused during the heating that follows the spray drying, and serves to primarily bond the first mineral particles together. Different types of glass frit may be used including, but not limited to, glass frit selected from the group consisting of silica glass frit, silicate glass frit, borosilicate glass frit and combinations thereof. A silica glass frit would typically be comprised of 100 percent by weight of silica. A preferred silicate glass frit composition may, for example, comprise by weight about 70 to about 80 percent silica, about 10 to about 20 percent sodium oxide, about 5 to about 10 percent calcium oxide, about 0.5 to about 1 percent aluminum oxide, about 2 to about 5 percent magnesium oxide and about 0.5 to about 1 percent potassium oxide, based on the total weight of the glass frit. A non-limiting example of a silicate glass frit composition by weight is about 73 percent silica, about 16 percent sodium oxide, about 5 percent calcium oxide, about 1 percent aluminum oxide, about 4 percent magnesium oxide and about 1 percent potassium oxide, based on the total weight of the glass frit. A boro-silicate glass frit composition may, for example, comprise by weight about 50 to about 80 percent silica, about 10 to about 30 percent boron oxide, about 1 to about 2 percent aluminum oxide, about 0 to about 10 percent magnesium oxide, about 0 to about 3 percent zinc oxide, about 0 to about 2 percent calcium oxide, about 1 to about 5 percent sodium oxide, about 0 to about 2 percent potassium oxide and about 0 to about 2 percent lithium oxide, based on the total weight of the glass frit. A non-limiting example of a boro-silicate glass frit composition by weight is about 52 percent silica, about 27 percent boron oxide, about 9 percent aluminum oxide, about 8 percent magnesium oxide, about 2 percent zinc oxide, about 1 percent calcium oxide, about 1 percent sodium oxide, about 1 percent potassium oxide and about 1 percent lithium oxide, based on the total weight of the glass frit.

The size of the glass frit utilized in the slurry can vary. Typically the average particle size of the glass frit ranges from about 0.01 micrometer to about 100 micrometers, preferably about 0.05 micrometer to about 50 micrometers, and most preferably about 0.1 micrometer to about 25 micrometers. The average particle size of the glass frit in relation to the average particle size of the first mineral particles having a Moh's hardness of at least about 5 can vary. Typically, the average particle size of the glass frit is about 1 to about 200 percent of the average particle size of the first mineral particles, preferably about 10 to about 100 percent, and most preferably about 15 to about 50 percent. Typically the weight ratio of glass frit to first mineral particles in the slurry ranges from about 10:90 to about 90:10. The shape of the glass frit can also vary. Typically, the glass frit is irregular in shape.

Preferably, the coefficient of thermal expansion of the glass frit is the same or substantially the same as that of the first mineral particles having a Moh's hardness of at least about 5.

The slurry typically comprises about 5 percent to about 75 percent by weight glass frit, based upon the total weight of the slurry, preferably about 10 to about 50 percent by weight, and most preferably about 20 to about 30 percent by weight. The agglomerate abrasive grains prepared according to the method of the present invention typically comprise about 1 to about 90 percent by weight glass bonding material, based upon the total weight of the respective agglomerate abrasive grain, preferably about 10 to about 80 percent by weight, and most preferably about 40 to about 60 percent by weight.

Solvent

Examples of suitable solvents include, but are not limited to, water and non-aqueous solvents. Examples of useful non-aqueous solvents include, but are not limited to, alcohols such as ethyl alcohol and isopropanol, and ketones such as methyl ethyl ketones. Typically the solvent used is water. The solvent serves to disperse and/or dissolve the solvent-dispersible and/or solvent-soluble binder material, disperse the glass frit and mineral particles having a Moh's hardness greater than about 5, and affect the slurry characteristics such as solids loading and viscosity. Typically the slurry comprises about 20 to about 80 percent by weight solvent based upon the total weight of the slurry, preferably about 40 to about 60 percent by weight, and most preferably about 30 to about 50 percent by weight.

Solvent-Soluble Binder Material and Solvent-Dispersible Binder Material

Preferably, the solvent-soluble binder material and/or solvent-dispersible binder material present in the slurry is selected from the group consisting of water-soluble binder materials, water-dispersible binder materials, and combinations thereof, since water is the preferred solvent. The binder material preferably binds the glass frit and first mineral particles together during the spray drying process. Examples of useful water-soluble binder materials include, but are not limited to, those selected from the group consisting of methyl cellulose, hydroxyl ethyl cellulose, sodium carboxymethyl cellulose and polyvinyl alcohol. Examples of useful water-dispersible binder materials include, but are not limited to waxes.

The amount of solvent-soluble and/or solvent-dispersible binder material contained in the slurry can vary. Typically the slurry comprises about 0.5 to about 40 percent by weight of the solvent-soluble and/or solvent-dispersible binder material, based upon the total weight of the slurry, preferably about 3 to about 30 percent by weight, and most preferably about 5 to about 15 percent by weight.

During the heating, which is subsequent to the formation of the spray dried precursor agglomerate abrasive grains, the solvent-soluble and/or solvent-dispersible binder material is preferably at least partially pyrolized, more preferably substantially pyrolized (i.e., greater than about 50 percent, preferably at least about 75 percent, more preferably at least about 90 percent by weight of the solvent-soluble and/or solvent-dispersible binder material is pyrolized) and most preferably completely pyrolized. Thus, the agglomerate abrasive grains typically comprise about 0 to about 40 percent by weight solvent-soluble and/or solvent-dispersible binder material based upon the total weight of the agglomerate abrasive grains, preferably about 0 to about 30 percent by weight, more preferably about 0 to about 5 percent by weight, and most preferably about 0 percent by weight.

Additives

The slurry may optionally further comprise one or more additives including, but not limited to those selected from the group consisting of fillers, pore formers, surfactants and silane coupling agents. A sufficient amount of additive may be included to achieve the desired result.

Examples of suitable fillers include, but are not limited to, those selected from the group consisting of metal carbonates (e.g., calcium carbonate, calcite, limestone, sodium carbonate and magnesium carbonate), silicates (e.g., talc, clays, feldspars, mica, calcium silicate, sodium silicate and anhydrous potassium silicate), metal sulfates (e.g., calcium sulfate, sodium sulfate, aluminum sodium sulfate and aluminum sulfate), salts (e.g., sodium chloride, sodium cryolite, potassium cryolite and magnesium chloride), gypsum, vermiculite, wood flour, carbon black, sulfur, graphite and metal sulfides.

Examples of suitable pore formers include but are not limited to those selected from the group consisting of phenolic particles, polyurethane foam particles, styrene particles and alumina particles.

Examples of suitable surfactants include, but are not limited to, those selected from the group consisting of anionic surfactants, cationic surfactants, nonionic surfactants, amphoteric surfactants, and combinations thereof. Examples of useful specific surfactants, include, but are not limited to, the nonionic surfactant ethoxylated nonylphenol, the anionic surfactants sodium stearate and sodium diisopropylnapthalene sulfonate, and the cationic surfactant dodecyltrimethylammonium chloride. Typically, the slurry comprises about 0 to about 5 percent by weight surfactant (if included), based on the total weight of the slurry, preferably about 0.1 to about 2 percent by weight, and most preferably about 0.2 to about 1 percent by weight.

Slurry Characteristics

The viscosity of the slurry may vary. However, if the viscosity is too high, fouling of the spray-dryer head may occur. If the viscosity of the slurry is too low, a plurality of hollow precursor agglomerate abrasive grain may result, which is not preferred. Preferably, at least a portion, more preferably the majority, and most preferably the entire plurality of precursor agglomerate abrasive grains as well as the plurality of the final agglomerate abrasive grains are solid (i.e., not hollow).

The solids loading of the slurry can vary. However, if the solids loading is too high, fouling of the spray-dryer head may occur. If the solids loading of the slurry is too low, a plurality of hollow precursor agglomerate abrasive grains may be formed, which is not preferred. Typically, the solids loading of the slurry ranges from about 1 to about 50 weight percent, based on the total weight of the slurry, preferably about 10 to about 40 weight percent, and most preferably about 20 to about 35 weight percent.

Spray-Dryer

Suitable spray-dryers are commercially available. An example of a useful commercially available spray-dryer is that available under the trade designation "MOBIL MINOR" from Niro Company, Columbia, Md.

During the spray drying process, the slurry is typically pumped through an atomizing head, where it is formed into a plurality of precursor agglomerate abrasive 1 grains, which is subsequently dried in a drying chamber with heat under an optional partial vacuum.

The spray-dryer may, for example, utilize a rotary wheel atomizer, a single-fluid atomizer head or a two-fluid atomizer head. Many different head designs are available from multiple vendors (Niro, Inc., Bowen, etc.). The spray-dryer may optionally employ ultrasonic vibration as part of the atomization process. The dried precursor agglomerate abrasive grain size may vary depending upon the processing parameters and slurry characteristics, for example. Increasing fluid pressure through a fluid atomizer head, the frequency of the ultrasonic vibration, and/or spinning rate of a rotary wheel atomizer typically results in the formation of smaller sized precursor agglomerate abrasive grains. Similarly, decreasing the viscosity and surface tension of the slurry typically results in a decrease in the precursor agglomerate abrasive grain size, as will reducing the solids content of the slurry. Conversely, decreasing the fluid pressure through a fluid atomizer head, decreasing the frequency of the ultrasonic vibration, decreasing the spinning rate of a rotary wheel, increasing the slurry viscosity, increasing the slurry surface tension, increasing the solids loading and/or increasing the feed rate, for example, typically results in larger agglomerate abrasive grains.

Typically, once the precursor agglomerate grains are formed and entrained in air, they pass through a heating/drying chamber, usually under slightly reduced pressure where they are is dried. The inlet and outlet temperatures of the spray dryer are preferably sufficiently high to drive off solvent present in the precursor agglomerate abrasive grains, and thereby minimize or prevent precursor agglomerate abrasive grains from building up in the spray drying chamber and/or piping leading therefrom. The build up of agglomerate abrasive grains in the chamber and/or piping results in lower yields.

The spray-dryer inlet temperature affects, for example, the drying rate, and ultimately affects the morphology of the precursor agglomerate abrasive grains. If the inlet temperature is too low there may be incomplete drying of the precursor agglomerate abrasive grains. If the inlet temperature is too high there may be, for example, a number of misshapen, non-spherical dried precursor agglomerate abrasive grains, premature partial pyrolysis of the solvent-dispersible and/or solvent-soluble binder material prior to heating, and/or fouling of the atomizing head. Preferably the inlet temperature of the spray-dryer ranges from about 90° C. to about 400° C., more preferably about 90° C. to about 300° C., and most preferably about 90° C. to about 250° C.

If the outlet temperature is too low, the precursor agglomerate abrasive grains may not dry sufficiently. If the outlet temperature is too high a number of severely misshapen precursor agglomerate abrasive grains may result. A lower inlet temperature, a faster feed rate, and/or a lower solids loading slurry can contribute to a lower outlet temperature. Preferably, the outlet temperature ranges from about 40° C. to about 250° C., more preferably about 40° C. to 150° C., and most preferably about 40° C. to about 120° C.

The shape of the spray dried precursor agglomerate abrasive grains is typically primarily dependent on the drying rate. Rapid drying typically results in misshapen, hollow or toroidally shaped precursor agglomerate abrasive grains. Slower drying rates typically result in spherically shaped precursor agglomerate abrasive grains. If spherical precursor agglomerate abrasive grains are desired, lower inlet temperatures (about 90° C. to about 250° C.) and outlet temperatures (about 40° C. to about 120° C.) are generally preferred, as such temperatures tend to lead to slower drying, allowing the precursor agglomerate abrasive grains to stabilize in a spherical shape before drying.

After drying, the precursor agglomerate abrasive grains are typically removed from the drying chamber in a continuously moving air stream, collected with a baghouse-type filter and/or gravity-assisted cyclone device, and removed for subsequent processing.

Second Mineral Particles

Optionally, at least a portion of the plurality of precursor agglomerate abrasive grains can be mixed with second mineral particles, typically prior to heating to a temperature(s) sufficient to at least partially fuse the glass frit. The second mineral particles preferably serve to prevent fusing of the agglomerate abrasive grain together during fusion of the glass frit. The second mineral particles, if used, preferably have a softening point or melting point or decomposition temperature greater than the maximum temperature employed during heating. Useful second mineral particles preferably and typically have a softening point (for glass materials and the like), or melting point (for crystalline materials and the like), or decomposition temperature, greater than the softening point of the glass frit, wherein it is understood that not all materials have each of a melting point, a softening point, or a decomposition temperature. For a material that does have two or more of a melting point, a softening point, or a decomposition temperature, it is understood that the lower of the melting point, softening point, or decomposition temperature is greater than the softening point of the glass frit. Examples of useful second mineral particles include, but are not limited to, metal oxides (e.g., aluminum oxide and amorphous fused silica), metal nitrides (e.g., silicon nitride) and graphite, as well as the materials listed above for the first mineral particles.

The second mineral particles typically have an average particle size ranging from about 1 to about 50 percent of the average particle size of the precursor agglomerate abrasive grains, preferably about 2 to about 20 percent, and most preferably about 5 to about 10 percent. Typically, about 1 to about 75 percent by weight of second mineral particles are combined with the precursor agglomerate abrasive grains, based upon the total weight of the second mineral particles and the precursor agglomerate abrasive grains, preferably about 5 to about 50 percent by weight, and most preferably about 10 to about 30 percent by weight.

The second mineral particles, or at least a significant portion of them, can typically be separated from the plurality of agglomerate abrasive grains after heating, if desired, by sieving, sedimentation, or decanting, for example.

The hardness of the second mineral particle can vary. Typically, if the second mineral particles are not intended to be separated from the agglomerate abrasive grains after heating, the second mineral particles would be selected to have a hardness less than the first mineral particles so that the abrasive qualities of the abrasive article would be primarily due to the first mineral particles. If the second mineral particles were to be removed from the agglomerate abrasive grains, the hardness of the second mineral particles would not be as relevant. For either situation though, the melting point, decomposition temperature, and/or softening point should be appropriately selected as discussed previously.

Heating After Spraying

The spray-dried precursor agglomerate abrasive grains (and optional second mineral particles, if present) are heated to at least one temperature such that the glass frit at least partially fuses to provide a plurality of agglomerate abrasive grains each comprised of the first mineral particles bonded together via glass binder material. Such heating is typically done in a furnace. Sutiable furnaces are commercially available, for example, from Fisher Scientific, Pittsburgh, Pa. The spray-dried precursor agglomerate abrasive grains are typically heated to at least partially pyrolize, preferably, completely pyrolize, the solvent-dispersible and/or solvent-soluble binder material, and to at least partially fuse (including even completely fusing) the glass frit to provide the agglomerate abrasive grains. The temperature(s) for the heating is preferably selected to be high enough to allow for partial to complete pyrolysis of solvent-soluble and/or solvent-dispersible binder and partial to complete fusing of the glass frit, but not so high as to cause complete fusing of all the agglomerate abrasive grains such that a solid mass is formed or to cause significant breakdown (e.g., oxidation) of the first mineral particles having a Moh's hardness of at least about 5.

Heating may be conducting a single-stage or in multiple-stages. The heating is most typically a two-stage process. For a two-stage process the precursor agglomerate abrasive grains are typically heated to and held at a temperature(s) high enough to at least partially pyrolize the solvent-dispersible and/or solvent-soluble binder but not high enough to at least partially fuse the glass frit. This first-stage is typically conducted at a temperature(s) in the range from about 50° C. to about 600° C., more typically from about 75° C. to about 500° C. The subsequent second-stage of the heating is typically conducted at a temperature(s) suitable to at least partially fuse the glass frit. This second-stage is typically conducted at a temperature in the range from about 400° C. to about 1200° C., more typically about 500° C. to about 850° C. For a single-stage process, the precursor agglomerate abrasive grains are typically heated to and held at a temperature(s) suitable to both at least partially pyrolize the solvent-dispersible and/or solvent-soluble binder and at least partially fuse the glass frit. The temperature(s) at which the agglomerate abrasive grains are held for a single-stage process typically ranges from about 400° C. to about 1200° C., more typically about 500° C. to about 850° C. For either a single-stage process or multiple-stage process, the temperature is typically increased gradually to a desired temperature(s). Typically, the heating lasts for about 500 to about 1500 minutes, more typically about 700 to about 1000 minutes regardless of whether a one-stage or multiple-stage process is employed.

The selection of the heating temperature may depend on a number of factors including, but not limited to, the softening point of the glass frit, the temperature stability of the mineral particles in the precursor agglomerate abrasive grain, and the final porosity and strength of the agglomerate abrasive grains desired after heating. The selection of the length of heating may depend on a number of factors, including but not limited to, the amount of solvent-dispersible and/or solvent-soluble binder present in the precursor agglomerate abrasive grains, and the final strength and porosity of the agglomerate abrasive grains desired after heating.

The heating temperature(s) should be greater than the softening point of the glass frit in order to cause the glass frit to at least partially fuse. Preferably, the heating temperature is less than the lower of at least one of a softening point, or melting point, or decomposition temperature of the first mineral particles having a Moh's hardness greater than about 5. If second mineral particles are included, the heating temperature(s) is preferably less than the lower of at least one of a softening point, or melting point, or decomposition temperature of the second mineral particles. The greater the amount of solvent-dispersible and/or solvent-soluble binder the typically the longer the heating. Typically, the greater the strength desired for the agglomerate abrasive grains, the longer the heating. The greater the porosity desired for the agglomerate abrasive grains, the typically the shorter the heating.

If the first mineral particles having a Moh's hardness of at least about 5 present in the precursor agglomerate abrasive grains are susceptible to oxidation, the heating is preferably conducted in a non-oxidizing atmosphere such as vacuum, nitrogen, or argon.

In one embodiment, the method of the invention further comprises, after heating, grading the plurality of agglomerate abrasive grain to provide a plurality of the agglomerate abrasive grain having a specified nominal grade, the specified nominal grade having a particle size distribution ranging from fine to coarse.

Optional Heat-Treatment to Provide a Glass Ceramic Bonding Material

Glasses for making glass-ceramics will be apparent to those skilled in the art. Techniques for making glasses are known in the art. Suitable glasses are also commercially available. Glasses for making glass-ceramics include those in the systems selected from the group consisting of magnesium aluminosilicate, lithium aluminosilicate, zinc aluminosilicate, calcium aluminosilicate, and combinations thereof. The glass for making the glass-ceramic may comprise nucleating agents. Nucleating agents are known to facilitate the formation of the crystalline ceramic phase(s) in the glass-ceramic. Known crystalline ceramic phases that can form glasses within the above listed systems include: cordierite ($2MgO.2Al_2O_3.5SiO_2$), gehlenite ($2CaO.Al_2O_3.SiO_2$), anorthite ($2CaO.Al_2O_3.2SiO_2$), hardystonite ($2CaO.ZnO.2SiO_2$), akeranite ($2CaO.MgO.2SiO_2$), spodumene ($2Li_2O.Al_2O_3 4SiO_2$), willemite ($2ZnO.SiO_2$), and gahnite ($ZnO.Al_2O_3$).

The heat-treatment of certain glasses to form glass-ceramics is well known in the art. The heating conditions to nucleate and grow glass-ceramics are known for a variety of glasses. Alternatively, one skilled in the art can determine the appropriate conditions from a Time-Temperature-Transformation (TTT) study of the glass using techniques known in the art.

Typically, glass-ceramics are stronger than the glasses from which they are formed. Hence, the strength of the bonding material may be adjusted, for example, by the degree to which the glass is converted to crystalline ceramic phase(s). Alternatively, or in addition, the strength of the bond material may also be affected, for example, by the number of nucleation sites created, which may in turn be used to affect the number, and in turn the size of the crystals of the crystalline phase(s). For additional details regarding forming glass ceramics, see, for example *Glass-Ceramics*, P. W. McMillan, Academic Press, Inc., $2^{nd}$ edition, 1979, the disclosure of which is incorporated herein by reference.

Agglomerate Abrasive Grain Prepared According to the Method of the Present Invention Preferably, at least a portion, more preferably a majority by weight, and most preferably all the agglomerate abrasive grains prepared according to the method of the invention are spherical. A "Method for Determining Whether Agglomerate Abrasive Grain is Spherical" is provided herein. Spherical agglomerate abrasive grains are easier to handle and typically provide more uniform abrasive properties. However, other shapes such as, for example, ellipsoid and irregularly shaped rounded agglomerate abrasive grain may also be satisfactory for their intended purpose. Preferably at least a portion, more preferably a majority by weight, and most preferably all of the plurality of agglomerate abrasive grains prepared according to the method of the invention are solid. Typically the agglomerate abrasive grains made according to the method of the present invention are free-flowing.

Typically, the agglomerate abrasive grains made according to the method of the present invention have an average particle size ranging from about 1 micrometer to about 500 micrometers, more typically about 1 to about 300 micrometers, even more typically about 1 to about 250 micrometers, and most typically about 1 micrometer to about 200 micrometers. The agglomerate abrasive grains may be porous or nonporous. The porosity is typically about 0 to about 60 percent by volume, more typically about 0 to about 25 percent as observed by Scanning Electron Microscopy.

Abrasive Articles

Agglomerate abrasive grains made according to the method of the present invention can be used in conventional abrasive products, such as coated abrasive products, bonded abrasive products (including vitrified, resinoid, and metal bonded grinding wheels, cutoff wheels, mounted points, and honing stones), nonwoven abrasive products, and abrasive brushes. Typically, abrasive products (i.e., abrasive articles) include abrasive article binder material and abrasive particles (which in practicing the present invention includes mineral particles agglomerated together in the form of agglomerate abrasive grains made according to the present invention), secured within the abrasive product by the abrasive article binder material. Methods of making abrasive products are well known to those skilled in the art. Furthermore, agglomerate abrasive grains made according to the method of the present invention can be used in abrasive applications that utilize slurries of abrading compounds (e.g., polishing compounds), milling media, shot blast media, vibratory mill media, and the like.

Coated abrasive products generally include a backing, abrasive material, and at least one abrasive article binder material to hold abrasive particles (which in practicing the present invention includes agglomerate abrasive grains made according to the present invention) onto the backing. The backing can be any suitable material, including cloth, polymeric film, fiber, nonwoven webs, paper, combinations thereof, and treated versions thereof. The abrasive article binder material can be any suitable binder, including an inorganic or organic binder (including thermally curable resins and radiation curable resins). The agglomerate abrasive grains can be present in one layer or more layers of the coated abrasive product.

Figure 1:
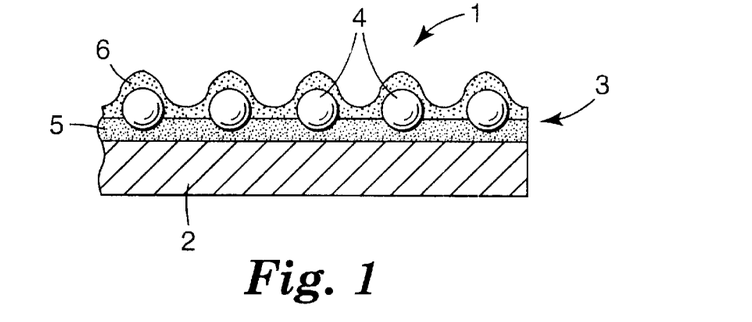
FIG. 1 is a fragmentary cross-sectional schematic view of a coated abrasive article including a plurality of agglomerate abrasive grains made according to the present invention.

An example of a coated abrasive product is depicted in FIG. 1. Referring to this figure, coated abrasive product 1 has a backing (substrate) 2 and abrasive layer 3. Abrasive layer 3 includes agglomerate abrasive grains made according to the present invention 4 secured to a major surface of backing 2 by make coat 5 and size coat 6. In some instances, a supersize coat (not shown) is used.

Bonded abrasive products typically include a shaped mass of abrasive particles (which in practicing the present invention includes agglomerate abrasive grains made according to the present invention), held together by an organic, metallic, or vitrified abrasive article binder material. Such shaped mass can be, for example, in the form of a wheel, such as a grinding wheel or cutoff wheel. The diameter of grinding wheels typically is about 1 cm to over about 1 meter; the diameter of cut off wheels about 1 cm to over about 80 cm (more typically about 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g., double disc grinder) or other conventional bonded abrasive shape. Bonded abrasive products typically comprise about 3 to about 50 percent by volume abrasive article binder material, about 30 to about 90 percent by volume abrasive material, up to about 50 percent by volume additives (including grinding aids), and up to about 70 percent by volume pores, based on the total volume of the bonded abrasive product. Typically, grinding wheels have at least about 10 percent, at least about 20 percent, or even greater porosity.

Figure 2:
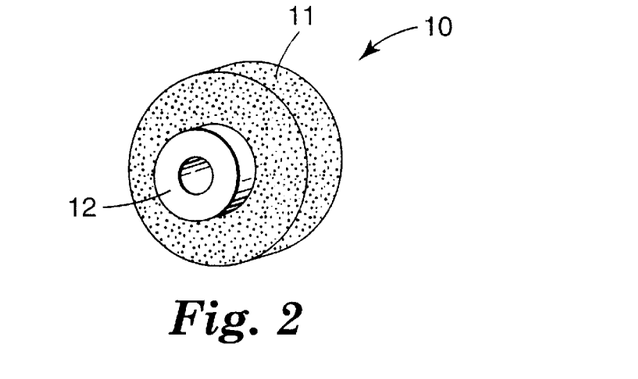
FIG. 2 is a perspective view of a bonded abrasive article including a plurality of agglomerate abrasive grains made according to the present invention.

A preferred form is a grinding wheel. Referring to FIG. 2, grinding wheel 10 is depicted, which includes agglomerate abrasive grains made according to the method of the present invention 11, molded in a wheel and mounted on hub 12. An advantage that embodiments of agglomerate abrasive grains made according to the method of the present invention may offer in a bonded abrasive such as a grinding wheel may be room for chip clearance during metal removal. That is, the porosity present in certain embodiments of agglomerate abrasive grains made according to the present invention may provide room for chip clearance during metal removal.

Figure 3:
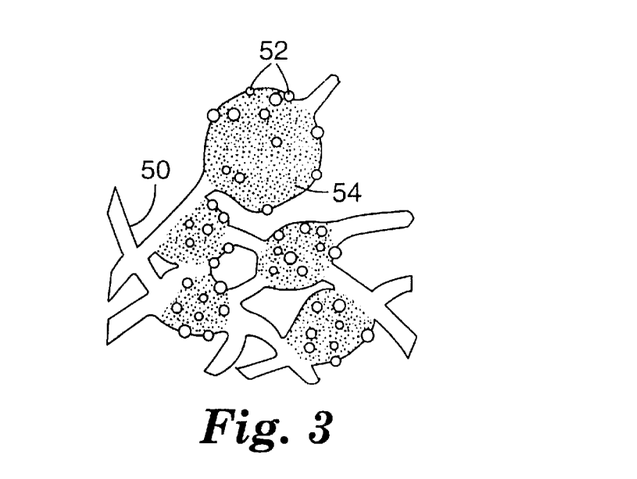
FIG. 3 is an enlarged schematic view of a nonwoven abrasive article including a plurality of agglomerate abrasive grains made according to the present invention.

Nonwoven abrasive products typically include an open porous lofty polymer filament structure having abrasive particles (which in practicing the present invention includes agglomerate abrasive grains made according to the method of the present invention), distributed throughout the structure and adherently bonded therein by an organic abrasive article binder material. Examples of filaments include polyester fibers, polyamide fibers, and polyaramid fibers. In FIG. 3, a schematic depiction, enlarged about 100×, of a typical nonwoven abrasive product is provided. Such a nonwoven abrasive product comprises fibrous mat 50 as a substrate, onto which agglomerate abrasive grains made according to the present invention 52 are adhered by abrasive article binder material 54.

Useful abrasive brushes include those having a plurality of bristles unitary with a backing (see, e.g., U.S. Pat. No. 5,427,595 (Pihl et al.); U.S. Pat. No. 5,443,906 (Pihl et al.); U.S. Pat. No. 5,679,067 (Johnson et al.); and U.S. Pat. No. 5,903,951 (Ionta et al.); the disclosure of which is incorporated herein by reference). Preferably, such brushes are made by injection molding a mixture of polymer and abrasive particles (which in practicing the present invention includes agglomerate abrasive grains made according to the method of the present invention).

Suitable organic abrasive article binder materials for making abrasive products include, but are not limited to, thermosetting organic polymers. Examples of suitable thermosetting organic polymers include, but are not limited to, phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, acrylated urethane, acrylated epoxies, and combinations thereof. The abrasive article binder material and/or abrasive product may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles/agglomerate abrasive grains and/or filler. The abrasive article binder material chemistry may thermally cured, radiation cured or combinations thereof. Additional details on binder chemistry may be found in U.S. Pat. No. 4,588,419 (Caul et al.); U.S. Pat. No. 4,751,137 (Tumey et al.); and U.S. Pat. No. 5,436,063 (Follett et al.); the disclosures of which are incorporated herein by reference.

More specifically with regard to vitrified bonded abrasives, vitreous bonding materials, which exhibit an amorphous structure and are typically hard, are well known in the art. Bonded, vitrified abrasive products may be in the shape of a wheel (including cut off wheels), honing stone, mounted pointed or other conventional bonded abrasive shape. A preferred vitrified bonded abrasive product is a grinding wheel.

Examples of metal oxides that are used to form vitreous bonding materials include, but are not limited to, silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from a composition comprising from about 10 to about 100 percent glass frit, although more typically the composition comprises about 20 to 80 percent glass frit, or about 30 to about 70 glass frit. The remaining portion of the vitreous bonding material can be a non-frit material. Alternatively, the vitreous bond may be derived from a non-frit containing composition. Vitreous bonding materials are typically matured at a temperature(s) in the range from about 700° C. to about 1500° C., usually in the range from about 800° C. to about 1300° C., sometimes in the range from about 900° C. to about 1200° C., or even in the range from about 950° C. to about 1100° C. The actual temperature at which the bond is matured depends, for example, on the particular bond chemistry.

Preferred vitrified bonding materials may include those comprising silica, alumina (preferably, at least 10 percent by weight alumina), and boria (preferably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Abrasive article binder materials may also contain filler materials or grinding aids, typically in the form of a particulate material. Typically, the particulate materials are inorganic materials. Examples of useful fillers for these abrasive article binder materials include, but are not limited to, metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers), silicates (e.g., talc, clays (e.g., montmorillonite), feldspar, mica, calcium silicate, calcium metasilicate, sodium aluminosilicate, sodium silicate), metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (e.g., lime), aluminum oxide, and titanium dioxide), and metal sulfites (e.g., calcium sulfite).

In general, the addition of a grinding aid increases the useful life of the abrasive product. A grinding aid is a material that has a significant effect on the chemical and physical processes of abrading, which results in improved performance. Although not wanting to be bound by theory, it is believed that a grinding aid(s) will (a) decrease the friction between the abrasive material and the workpiece being abraded, (b) prevent the mineral particles from "capping" (i.e., prevent metal particles from becoming welded to the tops of the abrasive particles), or at least reduce the tendency of mineral particles to cap, (c) decrease the interface temperature between the mineral particles and the workpiece, or (d) decreases the grinding forces.

The abrasive products can contain 100 percent agglomerate abrasive grains made according to the present invention, or blends of a plurality of such agglomerate abrasive grain with other abrasive particles (which may also be agglomerated) and/or diluent particles. However, typically at least about 2 percent by weight, preferably at least about 5 percent by weight, and more preferably about 30 to about 100 percent by weight, of the abrasive particles in the abrasive products should be agglomerate abrasive grains made according to the present invention. In some instances, the plurality of agglomerate abrasive grain made according the present invention may be blended with other abrasive particles and/or diluent particles at a ratio between about 5 to about 75 percent by weight, about 25 to about 75 percent by weight, about 40 to about 60 percent by weight, or about 50 percent to about 50 percent by weight (i.e., in equal amounts by weight). Examples of suitable abrasive particles include fused abrasive grains such as fused aluminum oxide (including e.g., white fused alumina, heat treated aluminum oxide and brown aluminum oxide), silicon carbide, silicon nitride, boron carbide, titanium carbide, diamond, cubic boron nitride, garnet, fused alumina-zirconia, sol-gel-derived abrasive particles, and the like. The sol-gel-derived abrasive particles may be seeded or non-seeded. Likewise, the sol-gel-derived abrasive particles may be randomly shaped or have a shape associated with them, such as a triangle. Examples of sol gel abrasive particles include those described discussed above. The agglomerate abrasive grains may have essentially the same size as the diluent particles. Conversely, the agglomerate abrasive grains may be larger in size than the diluent particles.

Agglomerate abrasive grains made according to the present invention can also be combined with other abrasive agglomerates. The binder of the other abrasive agglomerates may be organic and/or inorganic. Additional details regarding abrasive agglomerates may be found, for example, in U.S. Pat. No. 4,311,489 (Kressner); U.S. Pat. No. 4,652,275 (Bloecher et al.); U.S. Pat. No. 4,799,939 (Bloecher et al.); U.S. Pat. No. 5,549,962 (Holmes et al.); and U.S. Pat. No. 5,975,988 (Christianson); the disclosures of which are incorporated herein by reference.

If there is a blend of agglomerate abrasive grains or a blend of agglomerate abrasive grains and abrasive particles, the particle/agglomerate types forming the blend may be of the same size. Alternatively, the particle/agglomerate types may be of different particle sizes. For example, the larger sized particles may be agglomerate abrasive grains made according to the present invention, with the smaller sized particles being another particle/agglomerate type. Conversely, for example, the smaller sized abrasive particles may be agglomerate abrasive grains made according to the present invention, with the larger sized particles being another particle/agglomerate type.

Examples of suitable diluent particles include, but are not limited to, marble, gypsum, flint, silica, iron oxide, aluminum silicate, glass (including glass bubbles and glass beads), alumina bubbles, alumina beads and diluent agglomerates.

The abrasive particles may be uniformly distributed in the abrasive article or concentrated in selected areas or portions of the abrasive article. For example, in a coated abrasive article, there may be two layers of abrasive particles/ abrasive grains. The first layer comprises abrasive particles/ grains other than agglomerate abrasive grains according to the present invention, and the second (outermost) layer comprises agglomerate abrasive grains made according to the present invention. Likewise in a bonded abrasive, there may be two distinct sections of the grinding wheel. The outermost section may be comprised of agglomerate abrasive grains made according to the present invention, unlike the innermost section. Alternatively, for example, agglomerate abrasive grains made according to the present invention may be uniformly distributed throughout the bonded abrasive article.

Further details regarding coated abrasive products can be found, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,152,917 (Pieper et al.);

U.S. Pat. No. 5,378,251 (Culler et al.); U.S. Pat. No. 5,417,726 (Stout et al.); U.S. Pat. No. 5,436,063 (Follett et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,954,844 (Law et al.); U.S. Pat. No. 5,961,674 (Gagliardi et al.); and U.S. Pat. No. 5,975,988 (Christianson); the disclosures of which are incorporated herein by reference. Further details regarding bonded abrasive products can be found, for example, in U.S. Pat. No. 4,453,107 (Rue); U.S. Pat. No. 4,741,743 (Narayanan et al.); U.S. Pat. No. 4,800,685 (Haynes et al.); U.S. Pat. No. 4,898,597 (Hay et al.); U.S. Pat. No. 4,997,461 (Markhoff-Matheny et al.); U.S. Pat. No. 5,038,453 (Narayanan et al.); 5,110,332 (Narayanan et al.); and U.S. Pat. No. 5,863,308 (Qi et al.) the disclosures of which are incorporated herein by reference. Further, details regarding vitreous bonded abrasives can be found, for example, in U.S. Pat. Nos. 4,543,107 (Rue); U.S. Pat. No. 4,898,597 (Hay); U.S. Pat. No. 4,997,461 (Markhoff-Matheny et al.); U.S. Pat. No. 5,094,672 (Giles et al.); U.S. Pat. No. 5,118,326 (Sheldon et al.); U.S. Pat. No. 5,131,926 (Sheldon et al.); U.S. Pat. No. 5,203,886 (Sheldon et al.); U.S. Pat. No. 5,282,875 (Wood et al.); U.S. Pat. No. 5,738,696 (Wu et al.); and U.S. Pat. No. 5,863,308 (Qi); the disclosures of which are incorporated herein by reference. Further details regarding nonwoven abrasive products can be found, for example, in U.S. Pat. No. 2,958,593 (Hoover et al.), the disclosure of which is incorporated herein by reference.

Methods for abrading with preferred abrasive agglomerate grains made according to the present invention range from snagging (i.e., high pressure high stock removal) to polishing (e.g., polishing medical implants with coated abrasive belts), wherein the latter is typically done with finer grades (e.g., less than ANSI 220 and finer) of abrasive particles. The abrasive agglomerate grains may also be used in precision abrading applications, such as grinding cam shafts with vitrified bonded wheels. The size of the agglomerate abrasive grains (and mineral particles comprising such agglomerate abrasive grain) used for a particular abrading application will be apparent to those skilled in the art.

Abrading with abrasive agglomerate grains made according to the present invention may be done dry or wet. For wet abrading, the liquid may be introduced or supplied in the form of a light mist to complete flood. Examples of commonly used liquids include, for example, water, water-soluble oils, organic lubricants, and emulsions. The liquid may serve to reduce the heat associated with abrading and/or act as a lubricant. The liquid may contain minor amounts of additives such as bactericide, antifoaming agents, and the like.

Agglomerate abrasive grains made according to the present invention may be used to abrade workpieces such as aluminum metal, carbon steels, mild steels, tool steels, stainless steel, hardened steel, titanium, glass, ceramics, wood, wood-like materials, paint, painted surfaces, organic coated surfaces and the like. The applied force during abrading typically ranges from about 1 to about 100 kilograms.

Agglomerate abrasive grains made according to the present invention may also be used in loose form or in a slurry wherein agglomerate abrasive grains are dispersed in a liquid medium (e.g., water).

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Method for Determining Whether Agglomerate Abrasive Grain is Spherical

The following method was used to determine whether a plurality of agglomerate abrasive grains was spherical. Scanning Electron Microscope micrographs were taken of a sample of the agglomerate abrasive grains at a magnification of ~700×. The long (L), intermediate (I) and short (S) dimensions of individual agglomerate abrasive grains were measured from the micrographs using a ruler. The sphericity (S) of the agglomerate abrasive grains were measured by following equation: $S=(L \times I \times S)/(L \times L \times L)$. For a perfectly spherical agglomerate abrasive grain, the sphericity of the agglomerate as measured by this equation would be equal to 1. An agglomerate abrasive grain is considered to be spherical if S is at least 0.75 to 1. Preferably an agglomerate abrasive grain has an S value of 0.9 to 1.

EXAMPLE 1

This example illustrates the preparation of a plurality of agglomerate abrasive grains containing 4–8 micrometer diamond with a 30:70 diamond to glass ratio by weight, wherein the plurality of precursor agglomerate abrasive grains was heated at 720° C.

The slurry was prepared as follows. About 40 grams of dextrin (a temporary starch binder obtained under the trade designation "STADEX 230" from A. E. Staley Manufacturing Company, Decatur, Ill.) was dissolved in about 146 grams of deionized water by stirring using an air mixer with a Cowles blade. Next, about 0.6 gram of a nonionic ether surfactant (obtained under the trade designation "TERGITOL 15-S-7" from Union Carbide Danbury, Conn.) was added to the solution. Next, about 113 grams of milled glass frit (obtained under the trade designation "SP1086" from Specialty Glass, Inc. Wilmington, Del.) was added to the solution. The glass frit had been milled prior to use to a median particle size of about 2.5 micrometers. Next, about 49 grams of 4–8 micrometer diamond powder (available from American Boarts Crushing Company, Boca Rotan, Fla.) was added to the slurry. The slurry was stirred using the air mixer for an additional 30 minutes after all the above constituents had been added together.

The slurry was spray dried using a rotory wheel spray-dryer (obtained under the trade designation "MOBILE MINOR UNIT" from Niro Inc.). The spray dryer inlet temperature was set at about 200° C., and the rotory wheel set at about 15,000 rpm. The slurry was pumped into the rotory wheel inlet at a pump speed flow rate setting of 4. The outlet temperature of the spray dryer varied from 90–95° C. during the spray drying of the slurry. The plurality of precursor agglomerate abrasive grains was collected at the spray dryer outlet.

The spray dried precursor agglomerate grains were mixed with about 10% by weight of 3 micrometer white aluminum oxide (obtained under the trade designation "PWA3" from Fujimi Corporation, Elmhurst, Ill.), based on the weight of the plurality of precursor agglomerate grains, and heated in a furnace in air. The heating schedule was as follows: 2° C./min. increase to 400° C., 1 hour hold at 400° C., 2° C./min increase to 720° C. 1 hour hold at 720° C., and 2° C./min. decrease to 35° C.

After heating, the agglomerate abrasive grains were sieved through a 90 micrometer mesh screen. The screened agglomerate abrasive grains were examined using a scanning electron microscope. The agglomerate abrasive grains were observed to range in size from about 20 micrometer to about 80 micrometer, with an average size of about 50 micrometer. The agglomerate abrasive grains were predominantly spherical in shape.

Coated abrasive articles comprising the agglomerate abrasive grains were prepared as generally described in U.S. Pat. No. 5,152,917 (Pieper et al.), the disclosure of which is incorporated herein by reference. About 26.8 grams of an acrylate ester resin blend (obtained under the trade designation "SR368D" from Sartomer Corporation); about 0.6 gram of amorphous silica particles (obtained under the trade designation "OX-50" from DeGussa Corporation, Ridgefield Park, N.J.); about 0.3 gram of a phosphine oxide, phenyl bis (2,4,6-trimethyl benzoyl) photoinitiator (obtained under the trade designation "IRGACURE 819" from the Ciba Geigy Company, Hawthorne, N.J.); about 0.5 gram of anionic polyester surfactant (obtained under the trade designation "ZYPHRUM PD9000" from ICI Americas, Inc., Wilmington, Del.); about 22 grams of 3 micrometer white aluminum oxide (obtained under the trade designation "PWA3" from ICI Americas, Inc., Wilmington, Del); about 16.9 grams of wollastonite; and about 2.6 grams of the screened Example 1 agglomerate abrasive grains were mixed together to provide a slurry.

The slurry was coated into a plastic polypropylene tool with 350 micrometer (height)×1.3 mm (width)×1.3 mm (length) cuboidal-shaped cavities. A 0.5 mm thick polyester film backing was placed over the slurry and a rubber roll applied over the polyester film backing so that the slurry wetted the surface of the polyester film backing. Next, the tool containing the slurry and the polyester film backing was exposed to ultraviolet light to cure the slurry. The slurry was cured by passing the tool, slurry and backing under two ultraviolet lamps (obtained from American Ultra Company, Lebanon, Ind.) that used a medium pressure mercury bulb that generated 400 Watts/inch (157.5 Watts/cm) at a speed of about 30 feet/minute (9 meters/minute). Next, the cured slurry that was adhered to the polyester film backing was removed from the tool. Double sided pressure sensitive adhesive tape (obtained under the trade designation "442PC" from 3M Company St. Paul, Minn.) was then laminated to the side of the backing opposite the cured slurry.

The abrading performance of an Example 1 coated abrasive article was evaluated using a single side lapping machine (obtained under the trade designation "6Y-1" from R. Howard Strasbaugh, Inc. of Long Beach, Calif.) that had been modified as follows. A subpad, made of 0.5 mm thick polycarbonate was laminated to 2.3 mm thick urethane foam, which was adhered to the steel polisher platform with a pressure sensitive adhesive.

A 30.5 cm circular-shaped (Example 1) coated abrasive article was adhered to the subpad with a pressure sensitive adhesive. The workpiece was a lithium aluminosilicate glass disc that had an outer diameter of 65 mm and an inner diameter of 20 mm. The workpiece holder utilized a spring loaded acetal resin ring having a 65 mm inner diameter (obtained under the trade designation "DELRIN" from E. I. duPont deNemours & Company) to constrain the glass disc during abrading. A 65 mm diameter carrier pad (obtained under the trade designation "DF2000" from Rodel of Newark, N.J.) was mounted on the steel back-up plate of the workpiece holder. The glass disc surface opposite the surface to be abraded was placed against the carrier pad that had been moistened with water. With no force applied, the surface of the acetal resin ring protruded beyond the surface of the glass disc.

The workpiece holder was brought into contact with the coated abrasive article so that the acetal resin ring retracted and there was direct contact of the glass disc with the coated abrasive article. Sufficient force was applied so that the resultant pressure on the glass disc was about 211 grams/$cm^2$. The glass disc center was offset from the coated abrasive article center about 70 mm. The coated abrasive article was rotated at about 150 rpm in the clockwise direction as viewed from the top. The workpiece holder was rotated at 50 rpm, also in the clockwise direction. A 4 volume % solution of a synthetic lubricant (obtained under the trade designation "LOH K-40" from LOH Optical Germantown, Wis.) in water was dripped directly onto the coated abrasive article at a flow rate of about 80 milliliters/minute. The disc was oscillated over the coated abrasive article a distance of about 25 mm. One period of oscillation was about 15 seconds. To precondition the coated abrasive article, a rough glass disc was abraded on the coated abrasive article for 5 minutes at a pressure of 564 grams/$cm^2$. Then, a test smooth glass disc was inserted in the workpiece holder and was abraded at a pressure of about 211 grams/$cm^2$ for five minutes. New test smooth glass discs were introduced into the workpiece holder and ground at a pressure of about 211 grams/$cm^2$ every 5 minutes. The test glass discs were weighed before and after each cycle to determine the total removal in grams. Using a glass disc density of 2.4 grams/$cm^3$ and a glass disc area of 34.01 $cm^2$, the grams of material removed was converted to micrometers per minute. The grinding rates of the Example 1 coated abrasive article for grinding times of 5, 10 (i.e., an additional 5 minutes), 15, 20, 25, and 30 minutes, were 14.1, 11.5, 11.3, 9.9, 10.2, and 9.7 micrometers per minute, respectively.

EXAMPLE 2

This example illustrates the preparation of a plurality of agglomerate abrasive grain containing 4–8 micrometer diamond with a 50:50 diamond to glass ratio by weight, wherein the plurality of precursor agglomerate abrasive grain was heated at 720° C.

The slurry was prepared as follows. About 48 grams of dextrin ("STADEX 230") was dissolved in about 160 grams of deionized water by stirring using an air mixer with a Cowles blade. Next, about 1.4 gram of organosilicone surfactant (obtained under the trade designation "SILWET L-7604" from OSi Specialties, Inc.) was added to the solution. Next, about 96 grams of milled glass frit ("SP 1086") was then added to the solution. The glass frit had been milled prior to use to a median particle size of 2.5 micrometer. Next, about 96 grams of 4–8 micrometer diamond powder (available from American Boarts Crushing Company, Boca Rotan, Fla.) was then added to the slurry. The slurry was stirred using the air mixer for an additional 20 minutes after all the above constituents had been added together.

The slurry was spray dried according to the procedure of Example 1 except that the outlet temperature of the spray dryer varied from 80–85° C. during the spray drying of the slurry. The precursor agglomerate abrasive grains were collected at the spray dryer outlet. The spray dried precursor agglomerate abrasive grains were mixed with about 20% by weight of 3 micrometer aluminum oxide ("PWA3"), based on the weight of the dried precursor agglomerate abrasive grains, and heated in a furnace in air as described in Example 1.

After heating, the agglomerate abrasive grains were sieved through a 90 micrometer mesh screen. The screened agglomerate abrasive grains, were examined using scanning electron microscope. The agglomerate abrasive grains were observed to range in size from about 20 micrometer to about 80 micrometer, with an average size of about 50 micrometer. The agglomerate abrasive grains were predominantly spherical in shape.

Coated abrasive articles comprising the agglomerate abrasive grains were prepared and tested as described in Example 1, except the slurry for making the abrasive articles was prepared from: about 26.8 grams of acrylate ester resin blend ("SR368D"); about 0.6 gram of amorphous silica particles ("OX-50"); about 0.3 gram of a phophine oxide, phenyl bis (2,4,6-trimethyl benzoyl) photoinitiator ("IRGACURE 819"); about 0.5 gram of anionic polyester surfactant ("ZYPHRUM PD9000"); about 23 grams of 3 micrometer white aluminum oxide ("PWA 3"); about 16.9 grams of wollastonite; and about 2 grams of the screened Example 2 agglomerate abrasive grains. The grinding rates of the Example 2 coated abrasive article for 5, 10 (i.e., an additional 5 minutes), 15, 20, 25, and 30 minutes were 16.5, 13.4, 12.7, 12.1, 11.8, and 12.3 micrometers per minute, respectively.

EXAMPLE 3

This example illustrates the preparation of a plurality of agglomerate abrasive grains containing aluminum oxide as a filler in addition to 4–8 micrometer diamond and glass frit, having a weight ratio of 6.7/66.7/26.7 of diamond to glass to aluminum oxide.

The slurry was prepared as follows. About 45 grams of dextrin ("STADEX 230") was dissolved in about 180 grams of deionized water by stirring using an air mixer with a Cowles blade for 30 minutes. Next, about 1 gram of surfactant ("SILWET L-7604") was added to the solution. Next, about 150 grams of milled glass frit ("SP 1086") was then added to the solution. The glass frit had been milled prior to use to a median particle size of 2.5 micrometer. Next, 60 grams of aluminum oxide ("PWA3") was added to the slurry.

Next, about 15 grams of 4–8 $\mu$m diamond powder (American Boarts Crushing Company, Boca Rotan, Fla.) was then added to the slurry. The slurry was continuously stirred using the air mixer for an additional 30 minutes after all the above constituents had been added thereto.

The slurry was spray dried according to the procedure of Example 1 except that the outlet temperature of the spray dryer varied from 80–86° C. during the spray drying of the slurry. The precursor agglomerate abrasive grains were collected at the spray dryer outlet. The spray dried precursor agglomerate grains were mixed with about 20% by weight of 3 micrometer white aluminum oxide ("PWA3"), based on the weight of the plurality of the dried precursor agglomerate abrasive grains, and heated in a furnace in air as described in Example 1.

After heating, the agglomerate abrasive grains were sieved through a 90 micrometer mesh screen. The screened agglomerate abrasive grains, were examined using a scanning electron microscope. The agglomerate abrasive grain were observed to range in size from about 20 micrometer to about 80 micrometer with an average size of about 50 micrometer. The agglomerate abrasive grains were predominantly spherical in shape.

Coated abrasive articles comprising the agglomerate abrasive grains were prepared as described in Example 1 except the slurry for making the abrasive articles was prepared from: about 26.8 grams of acrylate ester resin blend ("SR368D"); about 0.6 gram of amorphous silica particles ("OX-50"); about 0.3 gram of a phosphine oxide, phenyl bis (2,4,6-trimethyl benzoyl) photoinitiator ("IRGACURE 819"); about 0.5 gram of anionic polyester surfactant ("ZYPHRUM PD9000"); about 17.6 grams of 3 micrometer white aluminum oxide ("PWA3"); about 16.9 grams of wollastonite; and about 7.43 grams of the screened Example 3 agglomerate abrasive grains.

The grinding rates of the Example 3 coated abrasive article for grinding times of 5, 10 (i.e., an additional 5 minutes), 15, 20, 25, and 30 minutes were 19.9, 16.3, 15.0, 14.1, 13.4, and 13.1 micrometers per minute, respectively.

EXAMPLE 4

This example illustrates the preparation of a plurality of agglomerate abrasive grains containing 4–8 micrometer diamond with a 61:39 micrometer diamond to glass ratio by weight, wherein the plurality of precursor agglomerate abrasive grain was heated at 720° C.

The slurry was prepared as follows. About 30.0 grams of dextrin ("STADEX 230") was dissolved in about 100 grams of deionized water by stirring using an air mixer with a Cowles blade for 30 minutes. Next, about 0.9 gram of surfactant ("SILWET L7604") was added to the solution. Next, about 46.7 grams of milled glass frit ("SP 1086") was then added to the solution. The glass frit had been milled prior to use to a median particle size of 2.5 micrometer. Next, about 72.5 grams of 4–8 micrometer diamond powder (American Boarts Crushing Company) was then added to the slurry. The slurry was continuously stirred using the air mixer for an additional 30 minutes after all the above constituents had been added together.

The slurry was spray dried according to the procedure of Example 1 except that the outlet temperature of the spray dryer varied from 93–95° C. during the spray drying of the slurry. The precursor agglomerate abrasive grains were collected at the spray dryer outlet. The spray dried plurality of precursor agglomerate abrasive grains were mixed with about 20% by weight of 3 micrometer white aluminum oxide ("PWA3"), based on the weight of the precursor agglomerate abrasive grains, as described in Example 1.

After heating, the agglomerate abrasive grains were sieved through a 90 micrometer mesh screen. The screened agglomerate abrasive grains were examined using scanning electron microscopy. The agglomerate abrasive grains were observed to range in size from about 20 micrometer to about 80 micrometer with an average size of about 50 micrometer. The agglomerate abrasive grains were predominantly spherical in shape.

Coated abrasive articles comprising the agglomerate abrasive grains were prepared and tested as described in Example 1 except the slurry for making the abrasive article was prepared from: about 26.8 grams of acrylate ester resin blend ("SR368D"); about 0.6 gram of amorphous silica particles ("OX-50"); about 0.3 gram of phophine oxide, phenyl bis (2,4,6-trimethyl benzoyl) photoinitiator ("IRGACURE 819"); about 0.5 gram of anionic polyester surfactant ("ZYPHRUM PD9000"); about 23.3 grams of 3 micrometer white aluminum oxide ("PWA3"); about 16.9 grams of wollastonite; and about 1.1 grams of the screened Example 4 agglomerate abrasive grains.

The grinding rates of the Example 4 coated abrasive article for 5, 10 (i.e., an additional 5 minutes), and 15 minutes were 21.9, 21.6, and 21.4 micrometers per minute, respectively.

EXAMPLE 5

This example illustrates the preparation of a plurality of agglomerate abrasive grains containing 4–8 micrometer diamond with a 61:39 diamond to glass ratio by weight, wherein the plurality of precursor agglomerate abrasive grains were heated at 750° C.

The slurry was prepared and spray dried according to the procedure of Example 4. The spray dried plurality of precursor agglomerate abrasive grains were mixed with about 20% by weight of 3 micrometer aluminum oxide (Fujimi "PWA3"), based on the weight of the precursor agglomerate abrasive grains, and heated in a furnace in air as described in Example 1, except that the heating schedule was as follows: 2° C./min. increase to 400° C., 1 hour hold at 400° C., 2° C./min increase to 750° C., 1 hour hold at 750° C., and 2° C./min. decrease to 35° C.

After heating, the agglomerate abrasive grains were sieved through a 90 micrometer mesh screen. The screened agglomerate abrasive grains, were examined using a scanning electron microscope. The agglomerate abrasive grains were observed to range in size from about 20 micrometer to about 80 micrometer with an average size of about 50 micrometer. The agglomerate abrasive grains were predominantly spherical in shape.

Coated abrasive articles comprising the agglomerate abrasive grain were prepared as described in Example 1, except the slurry for making the abrasive article was prepared from: about 26.8 grams of acrylate ester resin blend ("SR368D"); about 0.6 gram of amorphous silica particles ("OX-50"); about 0.3 gram of phophine oxide, phenyl bis (2,4,6-trimethyl benzoyl) photoinitiator ("IRGACURE 819"); about 0.5 gram of anionic polyester surfactant ("ZYPHRUM PD9000"); about 23.3 grams of 3 micrometer white aluminum oxide ("PWA3"); about 16.9 grams of wollastonite; and about 1.72 grams of the screened Example 5 agglomerate abrasive grains.

A coated abrasive article was tested according to the procedure used for Example 1 except that the smooth test glass pieces were ground for 10 minutes each instead of 5 minutes. A new test smooth glass disc was introduced into the workpiece holder and ground every 10 minutes. Each grinding cycle was a 10 minute grinding interval with a new test glass piece. The grinding rates of the Example 5 coated abrasive article for 10, 20 (i.e., an additional 10 minutes), and 30 minutes were 39.4, 39.8, and 39 micrometers per minute, respectively.

EXAMPLE 6

This example illustrates the preparation of a plurality of agglomerate abrasive grains containing 6 micrometer diamond with a 50:50 diamond to glass ratio by weight, wherein the plurality of precursor agglomerate abrasive grains was heated at 720° C.

The slurry was prepared as follows. About, 17.5 grams of dextrin ("STADEX 230") was dissolved in about 57.8 grams of deionized water by stirring using an air mixer with a Cowles blade for 15 minutes. Next, about 0.5 gram of an organosilicone surfactant ("SILWET L-7604") was added to the solution. Next, about 35 grams of milled glass frit ("SP1086") was then added to the solution. The glass frit had been milled prior to use to a median particle size of 2.5 micrometer. Next, about 35 grams of 6 micrometer diamond powder (Beta Diamond Company, Yorba Linda, Calif.) was then added to the slurry. The slurry was continuously stirred using the air mixer for an additional 30 minutes after all the above constituents had been added together.

The slurry was spray dried according to the procedure of Example 1 except that the outlet temperature of the spray dryer varied from 90–95° C. during the spray drying of the slurry. The precursor agglomerate abrasive grains were collected at the spray dryer outlet. The spray dried precursor agglomerate abrasive grains were mixed with about 20% by weight of 3 micrometer white aluminum oxide ("PWA3"), based on the weight of the dried plurality of precursor agglomerate abrasive grains and heated in a furnace in air as described in Example 1.

After heating, the agglomerate abrasive grains were sieved through a 90 micrometer mesh screen to separate. The screened agglomerate abrasive grains, were examined using a secondary electron microscope. The agglomerate abrasive grains were observed to range in size from about 20 micrometers to about 80 micrometers, with an average size of about 50 micrometers. The agglomerate abrasive grains were predominantly spherical in shape.

Coated abrasive articles comprising the agglomerate abrasive grains were prepared and tested as described in Example 1, except the slurry for making the abrasive article was prepared as follows: about 92.75 grams of acrylate ester resin blend ("SR368D"); about 1.95 grams of amorphous silica particles ("OX-50"); about 0.97 gram of phophine oxide, phenyl bis (2,4,6-trimethyl benzoyl) photoinitiator "IRGACURE 819"); about 1.75 grams of anionic polyester surfactant ("ZYPHRUM PD9000"); about 86.6 grams of 3 micrometer white aluminum oxide ("PWA3"); about 60.4 grams of wollastonite; and about 5.6 grams of the screened Example 6 agglomerate abrasive grains.

The abrasive article described above was die cut into two 455 mm outer diameter, 180 mm inner diameter disks and mounted onto the top and bottom plates of a double sided lapping machine (obtained under the trade designation "AC500" from The Peter Wolters Company, Plainville, Mass.). Prior to grinding the abrasive articles were dressed with 220 grit aluminum oxide dressing sticks for about 10 minutes. The test pieces used in this example were 65 mm outer diameter, 20 mm inner diameter smooth test glass discs. Fifteen smooth test glass discs were ground during each grinding cycle. The glass discs were held in place on the machine by the use of fiber glass carriers (obtained from The Peter Wolters Company, Plainville, Mass.). The test glass discs were ground for 10 minute cycles. The upper and lower plates of the machine were rotated at 100 rpm and the inner pin ring of the machine was rotated at 12 rpm. The glass discs were ground at a pressure of 1.7 psi (120 gm/cm$^2$). A synthetic lubricant (obtained under the trade designation "CHEMCOOL" from Chemetall Oakite, Berkeley Heights, N.J.) diluted to 4 volume % in water, was fed through holes in the top plate of the machine at a flow rate of 200 ml/min during the grinding cycle. Each grinding cycle included a 10 minute grinding interval with 15 test glass pieces.

The grinding rates of the Example 6 coated abrasive article for 10, 20 (i.e., an additional 10 minutes), 30, 40, and 50 minutes, were 17, 25, 22, 20, and 18 micrometers per minute, respectively.

EXAMPLE 7

This example illustrates the preparation of a plurality of agglomerate abrasive grains containing 3–6 micrometer diamond with a 50:50 diamond to glass ratio by weight, wherein the plurality of precursor agglomerate abrasive grains was heated at 720° C.

The slurry was prepared as follows. About 17.5 grams of dextrin ("STADEX 230") was dissolved in about 57.8 grams of deionized water by stirring using an air mixer with a Cowles blade for 15 minutes. Next, about 0.5 gram of an organosilicone surfactant ("SFLWET L-7604") was added to the solution. Next, about 35 grams of milled glass frit ("SP1086") was then added to the solution. The glass frit had been milled prior to use to a median particle size of about 2.5 micrometer. Next, about 35 grams of 3–6 micrometer diamond powder (Beta Diamond Company, Yorba Linda, Calif.) was then added to the slurry. The slurry was continuously stirred using the air mixer for an additional 30 minutes after all the above constituents had been added together.

The slurry was spray dried according to the procedure of Example 1 except that the outlet temperature of the spray dryer varied from 90–95° C. during the spray drying of the slurry. The precursor agglomerate abrasive grains were collected at the spray dryer outlet. The spray dried precursor agglomerate abrasive grains were mixed with about 20% by weight of 3 micrometer aluminum oxide ("PWA3") based on the weight of the dried precursor agglomerate abrasive grains and heated in a furnace as described in Example 1.

After heating, the agglomerate abrasive grains were sieved through a 90 micrometer mesh screen. The screened agglomerate abrasive grains, were examined using a secondary electron microscope. The agglomerate abrasive grains were observed to range in size from about 20 micrometer to about 80 micrometer with an average size of about 50 micrometer. The agglomerate abrasive grains were predominantly spherical in shape.

Coated abrasive articles comprising the agglomerate abrasive grains were prepared and tested as described in Example 6, except the slurry for making the abrasive articles was prepared from: about 92.75 grams of acrylate ester resin blend ("SR368D"); about 1.95 grams of amorphous silica particles ("OX-50"); about 0.97 gram of phophine oxide, phenyl bis (2,4,6-trimethyl benzoyl) photoinitiator ("IRGACURE 819"); about 1.75 grams of anionic polyester surfactant ("ZYPHRUM PD9000"); about 86.57 grams of 3 micrometer white aluminum oxide ("PWA3"); about 60.4 grams of wollastonite; and about 5.6 grams of the plurality of agglomerate abrasive grain prepared according to the present example.

The grinding rates of the Example 7 coated abrasive article for 10, 20 (i.e., an additional 10 minutes), 30, 40 and 50 minutes, were 16, 22, 18, 17, and 6 micrometers per minute, respectively.

Various modifications and alterations of this invention will become apparent to those skilled in the art without departing from the scope and spirit of this invention, and it should be understood that this invention is not to be unduly limited to the illustrative embodiments set forth herein.

It is claimed:

1. A method for making a plurality of agglomerate abrasive grains, the method comprising:
    spray drying a slurry to provide a plurality of precursor agglomerate abrasive grains, the slurry comprising:
        first mineral particles having a Moh's hardness of greater than or equal to about 5;
        glass frit;
        solvent; and
        at least one of solvent-dispersible binder material or solvent-soluble binder material;
    heating the plurality of precursor agglomerate abrasive grains to at least one temperature such that the glass frit at least partially fuses to provide a plurality of agglomerate abrasive grains each comprised of said first mineral particles bonded together via glass binder material.

2. The method of claim 1 wherein a first heating step partially pyrolizes said solvent-dispersible or solvent-soluble binder material prior to said heating.

3. The method of claim 1 further comprising mixing at least a portion of the plurality of precursor agglomerate abrasive grains with second mineral particles prior to said heating, wherein the glass frit has a softening point and the second mineral particles have a softening point, and wherein the softening point of the second mineral particles is greater than the softening point of the glass frit.

4. The method of claim 1 further comprising mixing at least a portion of the plurality of precursor agglomerate abrasive grains with second mineral particles prior to said heating, wherein the glass frit has a softening point and the second mineral particles have a melting point, and wherein wherein the melting point of the second mineral particles is greater than the softening point of the glass frit.

5. The method of claim 1 wherein at least a majority by weight of said first mineral particles are selected from the group consisting of diamond particles, silicon carbide particles, aluminum oxide particles, zirconium oxide particles, modified ceramic aluminum oxide particles, cubic boron nitride particles, titanium carbide particles, titanium nitride particles, cerium oxide particles, silicon dioxide particles, and combinations thereof.

6. The method of claim 1 wherein at least a majority by weight of said first mineral particles are diamond particles.

7. The method of claim 1 wherein at least a majority by weight of said first mineral particles are cubic boron nitride particles.

8. The method of claim 1 wherein said plurality of agglomerate abrasive grains has an average particle size in the range from about 1 to about 500 micrometers.

9. The method of claim 1 wherein at least a portion of said plurality of agglomerate abrasive grains are spherical.

10. The method of claim 1 wherein at least a portion of said plurality of agglomerate abrasive grains are solid.

11. The method of claim 1 wherein the solvent is water.

12. The method of claim 1 wherein said first mineral particles have an average particle size of about 0.5 to about 50 percent of an average particle size of the plurality of agglomerate abrasive grains.

13. The method of claim 1 wherein said glass frit has an average particle size of about 10 to about 100 percent of an average particle size of said first mineral particles.

14. The method of claim 1 wherein the glass frit has an average particle size of about 15 to about 50 percent of an average particle size of said first mineral particles.

15. The method of claim 1 wherein a spray-dryer is used for said spray drying, wherein said spray-dryer has an inlet temperature of about 90° C. to about 400° C. and an outlet temperature of about 40° C. to about 250° C.

16. The method of claim 1 wherein the slurry comprises:
    about 5 to about 75 percent by weight of said first mineral particles;
    about 5 to about 75 weight percent of said glass frit;
    about 20 to about 80 percent by weight of said solvent; and
    about 0.5 to about 40 percent by weight of at least one of said solvent-dispersible or said solvent-soluble binder material,
    wherein said weight percents are based upon the total weight of the slurry.

17. The method of claim 1 further comprising heat-treating the glass binder material to provide glass-ceramic binder material bonding said first mineral particles together.

18. A method for making a plurality of agglomerate abrasive grains, the method comprising:
    spray drying a slurry using a spray-dryer to provide a plurality of precursor agglomerate abrasive grains, the slurry comprising:

first mineral particles having a Moh's hardness of greater than or equal to about 5;
glass frit;
solvent; and
at least one of solvent-dispersible binder material or solvent-soluble binder material,
said spray-dryer having an inlet temperature of about 90° C. to about 400° C. and an outlet temperature of about 40° C. to about 250° C.;
mixing said plurality of precursor agglomerate abrasive grains with second mineral particles; and
heating the mixture of said plurality of precursor agglomerate abrasive grains and said second mineral particles to at least one temperature such that the glass frit at least partially fuses to provide a plurality of agglomerate abrasive grains each comprised of said first mineral particles bonded together via glass binder material,
wherein the glass frit has a softening point and the first mineral particles have at least one of a softening point, melting point, or decomposition temperature and wherein the lower of the at least one of a softening point, melting point, or decomposition temperature of the first mineral particles is greater than the softening point of the glass frit.

19. The method of claim 18 wherein at least a majority by weight of said first mineral particles are diamond particles.

20. The method of claim 18 wherein at least a majority by weigh of said first mineral particles are cubic boron nitride particles.

21. The method of claim 18 wherein at least a portion of said plurality of agglomerate abrasive grains are spherical.

22. The method of claim 18 wherein the mixing at least a portion of the plurality of precursor agglomerate abrasive grains with second mineral particles is prior to said heating, wherein the glass frit has a softening point and the second mineral particles have a softening point, and wherein the softening point of the second mineral particles is greater than the softening point of the glass frit.

23. The method of claim 18 wherein the mixing at least a portion of the plurality of precursor agglomerate abrasive grains with second mineral particles is prior to said, heating, wherein the glass frit has a softening point and the second mineral particles have a melting point, and wherein the melting point of the second mineral particles is greater than the softening point of the glass frit.

24. The method of claim 18 further comprising heat-treating the glass binder material to provide glass- binder material bonding said first mineral particles together.

25. A method for making a plurality of agglomerate abrasive grains, the method comprising:
spray drying a slurry using a spray-dryer to provide a plurality of precursor agglomerate abrasive grains, the slurry comprising:
first mineral particles having a Moh's hardness of greater than or equal to about 5;
glass frit;
solvent; and
at least one of solvent-dispersible binder material or solvent-soluble binder material,
said spray-dryer having an inlet temperature of about 90° C. to about 400° C. and an outlet temperature of about 40° C. to about 250° C.;
mixing said plurality of precursor agglomerate abrasive grains with second mineral particles; and
heating the mixture of said plurality of precursor agglomerate abrasive grains and said second mineral particles to at least one temperature such that the glass frit at least partially fuses to provide a plurality of agglomerate abrasive grains each comprised of said first mineral particles and said second mineral particles bonded together via glass binder material,
wherein the glass frit has a softening point and the first mineral particles have at least one of a softening point, melting point, or decomposition temperature and wherein the lower of the at least one of a softening point, melting point or decomposition temperature of the first mineral particles is greater than the softening point of the glass frit,
wherein the glass frit has a softening point and the second mineral particles have at least one of a softening point, melting point, or decomposition temperature and wherein the lower of the at least one of a softening point, melting point, or decomposition temperature of the second mineral particles is greater than the softening point of the glass frit.

26. The method of claim 25 wherein at least a majority by weight of said first mineral particles are diamond particles.

27. The method of claim 25 wherein at least a majority by weight of said first mineral particles are cubic boron nitride particles.

28. The method of claim 25 wherein at least a portion of said plurality of agglomerate abrasive grains are spherical.

29. The method of claim 25 wherein the mixing at least a portion of the plurality of precursor agglomerate abrasive grains with second mineral particles is prior to said heating, wherein the glass frit has a softening point and the second mineral particles have a softening point, and wherein the softening point of the second mineral particles is greater than the softening point of the glass frit.

30. The method of claim 25 wherein the mixing at least a portion of the plurality of precursor agglomerate abrasive grains with second mineral particles is prior to said heating, wherein the glass frit has a softening point and the second mineral particles have a melting point, and wherein the melting point of the second mineral particles is greater than the softening point of the glass frit.

31. A method for making an abrasive article, the method comprising:
spray drying a slurry to provide a plurality of precursor agglomerate abrasive grains, the slurry comprising:
first mineral particles having a Moh's hardness of greater than or equal to about 5;
glass frit;
solvent; and
at least one of solvent-dispersible binder material or solvent-soluble binder material;
heating the plurality of precursor agglomerate abrasive grains to at least one temperature such that the glass frit at least partially fuses to provide a plurality of agglomerate abrasive grains each comprised of said first mineral particles bonded together via glass binder material; and
combining at least a portion of the plurality of the agglomerate abrasive grains with abrasive article binder material to provide said abrasive article.

32. The method according to claim 31 wherein said combining at least a portion of the plurality of the agglomerate abrasive grains with binder material includes combining fused abrasive grains with said abrasive article binder material.

33. The method of claim 31 wherein at least a majority by weight of said first mineral particles are diamond particles.

34. The method of claim 31 wherein at least a majority by weight of said first mineral particles are cubic boron nitride particles.

35. The method of claim 31 wherein at least a portion of said plurality of agglomerate abrasive grain are spherical.

36. The method of claim 31 further comprising heat-treating the glass binder material to provide glass- ceramic binder material bonding said first mineral particles together prior to combining at least a portion of the plurality of agglomerate abrasive grains with abrasive article binder material.

37. A method for making a coated abrasive article, the method comprising:
- spray drying a slurry to provide a plurality of precursor agglomerate abrasive grains, the slurry comprising:
    - first mineral particles having a Moh's hardness of greater than or equal to about 5;
    - glass frit;
    - solvent; and
    - at least one of solvent dispersible binder material or solvent-soluble binder material;
- heating the plurality of precursor agglomerate abrasive grains to at least one temperature such that the glass frit at least partially fuses to provide a plurality of agglomerate abrasive grains each comprised of said first mineral particles bonded together via glass binder material; and
- applying an abrasive layer comprising at least a portion of the plurality of agglomerate abrasive grains dispersed within abrasive article binder material to a major surface of a backing to provide said coated abrasive article.

38. The method of claim 37 wherein at least a majority by weight of said first mineral particles are diamond particles.

39. The method of claim 37 wherein at least a majority by weight of said first mineral particles are cubic boron nitride particles.

40. The method of claim 37 wherein at least a portion of said plurality of agglomerate abrasive grains are spherical.

41. The method of claim 37 further comprising heat-treating the glass binder material to provide glass-ceramic binder material bonding said first mineral particles together prior to applying said abrasive layer to said major surface of said backing to provide said coated abrasive article.

42. The method of claim 1 wherein the weight ratio of glass frit to first mineral particles in the slurry ranges from about 10:90 to about 90:10.

43. The method of claim 1 wherein heating occurs initially at temperature which at least partially pyrolizes the binder without at least partially fusing the glass frit and subsequently at a temperature which at least partially fuses the glass frit.

44. The method of claim 1 which further comprises after said heating, grading the plurality of agglomerate abrasive grain to provide a plurality of the agglomerate abrasive grain having a specified nominal grade, said specified nominal grade having a particle size distribution ranging from fine to coarse.

* * * * *

UNITED STATES PATENT AND TRADEMARK OFFICE
CERTIFICATE OF CORRECTION

PATENT NO. : 6,551,366 B1
DATED : April 22, 2003
INVENTOR(S) : D'Souza, Andrew S.

It is certified that error appears in the above-identified patent and that said Letters Patent is hereby corrected as shown below:

<u>Column 6,</u>
Line 47, delete "1" after the word "abrasive"

<u>Column 7,</u>
Line 8, delete the word "is"

<u>Column 8,</u>
Line 52, "Sutiable" should be -- Suitable --

<u>Column 12,</u>
Line 52, insert -- be -- after the word "may"

<u>Column 25,</u>
Line 29, "weigh" should be -- weight --

Signed and Sealed this

Twenty-seventh Day of January, 2004

JON W. DUDAS
*Acting Director of the United States Patent and Trademark Office*